(12) United States Patent
Field

(10) Patent No.: US 8,337,690 B2
(45) Date of Patent: Dec. 25, 2012

(54) METHOD AND APPARATUS FOR NEUTRALIZING ELECTROCHEMICALLY ACTIVATED LIQUIDS

(75) Inventor: Bruce F. Field, Golden Valley, MN (US)

(73) Assignee: Tennant Company, Minneapolis, MN (US)

(*) Notice: Subject to any disclaimer, the term of this patent is extended or adjusted under 35 U.S.C. 154(b) by 991 days.

(21) Appl. No.: 12/245,213

(22) Filed: Oct. 3, 2008

(65) Prior Publication Data

US 2009/0095639 A1    Apr. 16, 2009

Related U.S. Application Data

(60) Provisional application No. 60/977,506, filed on Oct. 4, 2007.

(51) Int. Cl.
*A47L 11/29* (2006.01)
*C25B 9/00* (2006.01)
*A61L 2/03* (2006.01)
*A47L 11/30* (2006.01)

(52) U.S. Cl. ............ 205/687; 15/98; 134/10; 134/21; 134/198; 204/263; 204/271; 205/701; 205/746; 205/766

(58) Field of Classification Search .......... 204/263, 204/275.1; 205/349, 687, 701, 742, 746, 205/766; 134/10, 21, 58 R, 198
See application file for complete search history.

(56) References Cited

U.S. PATENT DOCUMENTS

| | | | |
|---|---|---|---|
| 2,288,956 A | 7/1942 | Rosenkoetter | 40/126 |
| 3,725,226 A | 4/1973 | Stoner | 204/149 |
| 3,859,195 A | 1/1975 | Williams | 204/272 |
| 3,897,320 A | 7/1975 | Cook, Jr. | 204/95 |
| 3,933,614 A | 1/1976 | Bunn, Jr. | 204/266 |
| 4,018,658 A | 4/1977 | Alfin et al. | 204/109 |
| 4,099,489 A | 7/1978 | Bradley | 123/3 |
| 4,105,528 A * | 8/1978 | Hasebe | 204/237 |
| 4,108,052 A | 8/1978 | Cunningham | 99/275 |
| 4,121,543 A | 10/1978 | Hicks, Jr. et al. | 123/3 |
| 4,129,493 A | 12/1978 | Tighe et al. | 204/228 |
| 4,154,578 A | 5/1979 | Bane | 8/137 |
| 4,244,079 A | 1/1981 | Bane | 15/321 |
| 4,324,635 A | 4/1982 | Sweeney | 204/266 |
| 4,374,711 A | 2/1983 | Ogawa | 204/98 |
| 4,405,418 A | 9/1983 | Takemura | 204/95 |
| 4,502,929 A | 3/1985 | Stewart et al. | 204/147 |
| 4,574,037 A | 3/1986 | Samejima et al. | 204/98 |
| 4,600,495 A | 7/1986 | Fogt | 204/409 |

(Continued)

FOREIGN PATENT DOCUMENTS

AU    732602    4/2001

(Continued)

OTHER PUBLICATIONS

International Search Report of corresponding International Application No. PCT/US2008/078719, filed Mar. 10, 2008.

(Continued)

*Primary Examiner* — Keith Hendricks
*Assistant Examiner* — Steven A. Friday
(74) *Attorney, Agent, or Firm* — David D. Brush; Westman, Champlin & Kelly, P.A.

(57) ABSTRACT

A method and apparatus are provided for reducing an oxidation-reduction potential (ORP) of an electrochemically activated liquid. The ORP is reduced by emitting ions from an ion generator into the electrochemically activated liquid, wherein the ions have a charge polarity that is opposite to the ORP of the liquid.

17 Claims, 5 Drawing Sheets

U.S. PATENT DOCUMENTS

| | | | |
|---|---|---|---|
| 4,630,167 A | 12/1986 | Huggins | 361/213 |
| 4,663,091 A | 5/1987 | Seo | 261/72.1 |
| 4,670,113 A | 6/1987 | Lewis | 204/80 |
| 4,676,882 A | 6/1987 | Okazaki | 204/260 |
| 4,705,191 A | 11/1987 | Itzel et al. | 222/80 |
| 4,734,176 A | 3/1988 | Zemba, Jr. et al. | 204/149 |
| 4,810,344 A | 3/1989 | Okazaki | 204/228 |
| 4,832,230 A | 5/1989 | Janowitz | 222/80 |
| 4,875,988 A | 10/1989 | Aragon | 204/265 |
| 4,956,071 A | 9/1990 | Giuffrida et al. | 204/301 |
| 5,101,110 A | 3/1992 | Matsudo et al. | 250/427 |
| 5,186,860 A | 2/1993 | Joyce, Jr. et al. | 252/500 |
| 5,234,563 A | 8/1993 | Arai et al. | 204/229 |
| 5,250,161 A | 10/1993 | Chin et al. | 204/131 |
| 5,292,406 A | 3/1994 | Wanngard et al. | 204/95 |
| 5,316,646 A | 5/1994 | Arai | 204/306 |
| 5,320,718 A | 6/1994 | Molter et al. | 204/101 |
| 5,378,339 A | 1/1995 | Aoki et al. | 204/260 |
| 5,536,389 A | 7/1996 | La Naour et al. | 205/688 |
| 5,590,439 A | 1/1997 | Alazet | 15/320 |
| 5,593,476 A | 1/1997 | Coppom | 95/78 |
| 5,632,870 A | 5/1997 | Kucherov | 204/241 |
| 5,661,237 A | 8/1997 | Dussan et al. | 73/152.18 |
| 5,665,212 A | 9/1997 | Zhong et al. | 304/297 |
| 5,733,434 A | 3/1998 | Harada et al. | 205/746 |
| 5,762,779 A | 6/1998 | Shiramizu et al. | 205/746 |
| 5,766,438 A | 6/1998 | Ishibashi et al. | 204/520 |
| 5,779,891 A | 7/1998 | Andelman | 210/198.2 |
| 5,815,869 A | 10/1998 | Hopkins | 8/158 |
| 5,824,200 A | 10/1998 | Kitajima et al. | 204/265 |
| 5,835,680 A | 11/1998 | Glucksman et al. | 392/501 |
| 5,853,562 A | 12/1998 | Eki et al. | 205/743 |
| 5,858,201 A | 1/1999 | Otsuka et al. | 205/701 |
| 5,858,202 A | 1/1999 | Nakamura | |
| 5,928,505 A | 7/1999 | Inakagata et al. | 210/91 |
| 5,930,105 A | 7/1999 | Pitel et al. | 361/212 |
| 5,931,859 A | 8/1999 | Burke | 607/66 |
| 5,997,717 A * | 12/1999 | Miyashita et al. | 204/263 |
| 6,016,973 A | 1/2000 | Thompson et al. | 239/304 |
| 6,032,655 A | 3/2000 | Kavonius | 123/538 |
| 6,059,941 A | 5/2000 | Bryson et al. | 204/263 |
| 6,088,211 A | 7/2000 | Pitel | 361/212 |
| 6,101,671 A | 8/2000 | Wright et al. | 15/365 |
| 6,110,353 A | 8/2000 | Hough | 205/701 |
| 6,132,572 A | 10/2000 | Kim | 204/253 |
| 6,200,434 B1 | 3/2001 | Shinjo et al. | 204/230.2 |
| 6,231,747 B1 | 5/2001 | Fukuzuka et al. | 205/500 |
| 6,315,886 B1 | 11/2001 | Zappi et al. | 205/701 |
| 6,336,430 B2 | 1/2002 | De Souza et al. | 123/3 |
| 6,375,827 B1 | 4/2002 | Kurosu et al. | 205/687 |
| 6,379,628 B2 | 4/2002 | de Jong et al. | 422/186.04 |
| 6,409,895 B1 | 6/2002 | Ponzano | 204/260 |
| 6,425,958 B1 | 7/2002 | Giddings et al. | 134/21 |
| 6,488,016 B2 | 12/2002 | Kavonius | 123/538 |
| 6,502,766 B1 | 1/2003 | Streutker et al. | 239/332 |
| 6,585,827 B2 | 7/2003 | Field et al. | 134/6 |
| 6,638,364 B2 | 10/2003 | Harkins et al. | 134/21 |
| 6,652,719 B1 | 11/2003 | Tseng | 204/257 |
| 6,656,334 B2 * | 12/2003 | Tseng | 204/276 |
| 6,689,262 B2 | 2/2004 | Senkiw | 204/278.5 |
| 6,703,785 B2 | 3/2004 | Aiki et al. | 315/111.81 |
| 6,719,891 B2 | 4/2004 | Ruhr et al. | 205/500 |
| 6,735,812 B2 | 5/2004 | Hekman et al. | 15/320 |
| 6,842,940 B2 | 1/2005 | Christopher et al. | 15/320 |
| 6,855,233 B2 | 2/2005 | Sawada | 204/263 |
| 6,878,287 B1 | 4/2005 | Marais | 210/748 |
| 6,921,743 B2 | 7/2005 | Scheper et al. | 510/220 |
| 6,926,819 B2 | 8/2005 | Nakamura et al. | 205/701 |
| 6,964,739 B2 | 11/2005 | Boyd et al. | 210/167 |
| 6,974,561 B1 | 12/2005 | Thomason | 422/186.29 |
| 6,991,593 B2 * | 1/2006 | Price et al. | 588/252 |
| 7,008,523 B2 | 3/2006 | Herrington | 205/701 |
| 7,011,739 B2 | 3/2006 | Harkins et al. | 205/701 |
| 7,059,013 B2 | 6/2006 | Wydra et al. | 15/345 |
| 7,107,046 B1 | 9/2006 | Mainard et al. | 455/414.2 |
| 7,156,962 B2 | 1/2007 | Koizumi et al. | 204/292 |
| 7,160,472 B2 | 1/2007 | Van Vliet et al. | 201/748 |
| 7,226,542 B2 | 6/2007 | Zemel et al. | 210/748 |
| 7,238,272 B2 | 7/2007 | Sano | 205/701 |
| 7,303,300 B2 | 12/2007 | Dowling et al. | 362/101 |
| 7,309,136 B2 | 12/2007 | Lei | 362/101 |
| 7,836,543 B2 | 11/2010 | Field et al. | 15/320 |
| 7,891,046 B2 | 2/2011 | Field et al. | 15/320 |
| 8,007,654 B2 | 8/2011 | Field et al. | 205/746 |
| 8,012,339 B2 | 9/2011 | Field | 205/701 |
| 8,012,340 B2 | 9/2011 | Field et al. | 205/746 |
| 8,025,786 B2 | 9/2011 | Field et al. | 205/746 |
| 8,025,787 B2 | 9/2011 | Field et al. | 205/746 |
| 8,046,867 B2 | 11/2011 | Field et al. | 15/320 |
| 8,062,499 B2 | 11/2011 | Field | 205/337 |
| 2001/0002500 A1 | 6/2001 | Kasen et al. | 15/320 |
| 2001/0034922 A1 | 11/2001 | Ko | 15/320 |
| 2002/0023847 A1 | 2/2002 | Natsume | 205/687 |
| 2002/0027070 A1 | 3/2002 | Oyokota et al. | 204/257 |
| 2002/0032141 A1 | 3/2002 | Harkins | 510/253 |
| 2002/0038768 A1 | 4/2002 | Kasuya | 205/701 |
| 2002/0074237 A1 | 6/2002 | Takesako et al. | 205/628 |
| 2002/0112314 A1 | 8/2002 | Harkins | 15/321 |
| 2002/0185423 A1 | 12/2002 | Boyd et al. | 210/167 |
| 2003/0001439 A1 | 1/2003 | Schur | 310/11 |
| 2003/0062068 A1 | 4/2003 | Ko et al. | 134/28 |
| 2003/0070919 A1 | 4/2003 | Gilmore | 204/275.1 |
| 2003/0102270 A1 | 6/2003 | Schoeberl | 210/748 |
| 2003/0159230 A1 | 8/2003 | Oh | 15/320 |
| 2003/0159231 A1 | 8/2003 | Oh | |
| 2003/0159233 A1 | 8/2003 | Oh | 15/321 |
| 2003/0164306 A1 | 9/2003 | Senkiw | 205/633 |
| 2003/0213505 A1 | 11/2003 | Price et al. | 134/25.2 |
| 2004/0011665 A1 | 1/2004 | Koizumi et al. | 205/626 |
| 2004/0012913 A1 | 1/2004 | Andelman | 361/503 |
| 2004/0037737 A1 | 2/2004 | Marais et al. | 422/28 |
| 2004/0042201 A1 | 3/2004 | Lee | 362/101 |
| 2004/0069611 A1 | 4/2004 | MacGregor | 204/157.15 |
| 2004/0094432 A1 | 5/2004 | Neel et al. | 205/777.5 |
| 2004/0112763 A1 | 6/2004 | Itoh et al. | 205/746 |
| 2004/0166019 A1 | 8/2004 | Schultheiss | 422/22 |
| 2004/0168933 A1 | 9/2004 | Inoue | 205/746 |
| 2004/0226123 A1 | 11/2004 | Policicchio et al. | 15/115 |
| 2004/0250323 A1 | 12/2004 | Arai et al. | D32/1 |
| 2004/0256247 A1 | 12/2004 | Carson et al. | 205/688 |
| 2005/0103644 A1 | 5/2005 | Wilkins et al. | 205/751 |
| 2005/0121334 A1 | 6/2005 | Sumita | 205/628 |
| 2005/0126928 A1 | 6/2005 | Hung et al. | 205/746 |
| 2005/0136520 A1 | 6/2005 | Kinley et al. | 435/155 |
| 2005/0139239 A1 | 6/2005 | Prae | 134/34 |
| 2005/0139465 A1 | 6/2005 | Kasuya et al. | 204/271 |
| 2005/0139808 A1 | 6/2005 | Alimi | 252/187.26 |
| 2005/0194261 A1 | 9/2005 | Hadia | 205/701 |
| 2005/0244556 A1 | 11/2005 | Karren | 426/335 |
| 2006/0037869 A1 | 2/2006 | Mitchke | 205/701 |
| 2006/0054205 A1 | 3/2006 | Yabe et al. | 134/184 |
| 2006/0076248 A1 | 4/2006 | Kindred | 205/743 |
| 2006/0162735 A1 | 7/2006 | Thiebaut | 132/200 |
| 2006/0169575 A1 | 8/2006 | Sumita | 204/164 |
| 2006/0231503 A1 | 10/2006 | Flettner | 210/748 |
| 2006/0263240 A1 | 11/2006 | Hopkins | 422/28 |
| 2006/0272120 A1 * | 12/2006 | Barrick et al. | 15/321 |
| 2006/0280664 A1 | 12/2006 | Huang et al. | 422/292 |
| 2007/0009376 A1 | 1/2007 | Hamada et al. | 422/20 |
| 2007/0023273 A1 | 2/2007 | Kitaori et al. | 204/164 |
| 2007/0037267 A1 | 2/2007 | Lewis et al. | 435/161 |
| 2007/0141434 A1 | 6/2007 | Joshi et al. | 429/34 |
| 2007/0170072 A1 | 7/2007 | Shyu | 205/701 |
| 2007/0186367 A1 | 8/2007 | Field et al. | 15/320 |
| 2007/0186368 A1 | 8/2007 | Field et al. | |
| 2007/0186369 A1 | 8/2007 | Field et al. | 15/320 |
| 2007/0186954 A1 | 8/2007 | Field et al. | 134/6 |
| 2007/0186957 A1 | 8/2007 | Field et al. | 134/18 |
| 2007/0186958 A1 | 8/2007 | Field et al. | |
| 2007/0187261 A1 | 8/2007 | Field et al. | 205/742 |
| 2007/0187262 A1 | 8/2007 | Field et al. | 205/742 |
| 2007/0187263 A1 | 8/2007 | Field et al. | 205/742 |
| 2007/0272549 A1 | 11/2007 | Davis et al. | 204/260 |
| 2008/0264778 A1 | 10/2008 | Joshi et al. | 204/232 |
| 2008/0272060 A1 * | 11/2008 | Taguchi et al. | 210/748 |
| 2009/0008268 A1 | 1/2009 | Salathe et al. | 205/746 |
| 2009/0127128 A1 | 5/2009 | Kitaori et al. | 205/464 |

| | | | | | | |
|---|---|---|---|---|---|---|
| 2009/0148342 | A1 | 6/2009 | Bromberg et al. ............... 422/37 | JP | 11128941 | 5/1999 |
| 2009/0162505 | A1 | 6/2009 | Kriebel et al. ................ 426/335 | JP | 11180992 | 7/1999 |
| 2009/0184186 | A1 | 7/2009 | Suda et al. ..................... 239/690 | JP | 2000-079393 | 3/2000 |
| 2009/0212132 | A1 | 8/2009 | Simmonds et al. ........... 239/289 | JP | 2002-102856 | 4/2002 |
| 2009/0235481 | A1 | 9/2009 | Gosebruch et al. ............. 15/320 | JP | 2002-186969 | 7/2002 |
| 2010/0147700 | A1 | 6/2010 | Field et al. .................... 205/687 | JP | 2003-062573 | 3/2003 |
| 2010/0181208 | A1 | 7/2010 | Denison et al. ................ 205/687 | JP | 2003-181338 | 7/2003 |
| 2010/0189805 | A1 | 7/2010 | Saefkow et al. ............... 424/600 | JP | 2003-261190 | 9/2003 |
| 2010/0192987 | A1 | 8/2010 | Steffen et al. ................... 134/34 | JP | 2003-3266073 | 9/2003 |
| 2010/0276301 | A1 | 11/2010 | Field ............................. 205/701 | JP | 2003-334548 | 11/2003 |
| 2011/0121110 | A1 | 5/2011 | Field ............................. 239/690 | JP | 2003-334557 | 11/2003 |

FOREIGN PATENT DOCUMENTS

| | | |
|---|---|---|
| JP | 2004-073914 | 3/2004 |
| CN | 1379737 | 11/2002 |
| JP | 2004-121962 | 4/2004 |
| CN | 1440711 | 9/2003 |
| JP | 2004-129954 | 4/2004 |
| CN | 1845877 | 10/2006 |
| JP | 2004-148108 | 5/2004 |
| CN | 200977495 | 11/2007 |
| JP | 2004-148109 | 5/2004 |
| DE | 2951993 | 7/1981 |
| JP | 2005-006816 | 1/2005 |
| DE | 8430251 | 6/1984 |
| JP | 2005-535783 | 11/2005 |
| DE | 4406320 | 8/1995 |
| JP | 2006-036341 | 9/2006 |
| DE | 19752174 | 7/1998 |
| JP | 2007-000402 | 1/2007 |
| DE | 20210562 | 10/2002 |
| JP | 2007-136356 | 6/2007 |
| DE | 202004010572 | 11/2004 |
| JP | 2007-239041 | 9/2007 |
| DE | 202007005471 | 6/2007 |
| KR | 2001-0096847 | 11/2001 |
| DE | 102007017502 | 10/2008 |
| KR | 2002-0025023 | 11/2003 |
| EP | 0041373 | 12/1981 |
| KR | 2006-0007369 | 1/2006 |
| EP | 0104345 | 4/1984 |
| KR | 100599229 | 7/2006 |
| EP | 0199493 | 10/1986 |
| KR | 2009-0123297 | 12/2009 |
| EP | 0438902 | 7/1991 |
| NL | 1012257 | 12/2000 |
| EP | 0636581 | 2/1995 |
| WO | 8606098 | 10/1986 |
| EP | 0663176 | 7/1995 |
| WO | 9640591 | 12/1996 |
| EP | 0672623 | 9/1995 |
| WO | 9818723 | 5/1998 |
| EP | 0674026 | 9/1995 |
| WO | 9846874 | 10/1998 |
| EP | 0740329 | 10/1996 |
| WO | 9908719 | 2/1999 |
| EP | 0761235 | 3/1997 |
| WO | 9963843 | 12/1999 |
| EP | 1000554 | 5/2000 |
| WO | 0015561 | 3/2000 |
| EP | 1008662 | 6/2000 |
| WO | 0118279 | 3/2001 |
| EP | 1065170 A1 | 1/2001 |
| WO | 0127037 | 4/2001 |
| EP | 1162176 | 12/2001 |
| WO | 0214228 | 2/2002 |
| EP | 1188719 | 3/2002 |
| WO | 02066382 | 8/2002 |
| EP | 1293481 | 3/2003 |
| WO | 02102716 | 12/2002 |
| EP | 1308421 | 5/2003 |
| WO | 03009920 | 2/2003 |
| EP | 1386995 | 2/2004 |
| WO | 03022444 | 3/2003 |
| EP | 1309519 | 9/2004 |
| WO | 03022745 | 3/2003 |
| EP | 1533041 | 5/2005 |
| WO | 03040038 | 5/2003 |
| EP | 1671560 | 6/2006 |
| WO | 2004015172 | 2/2004 |
| EP | 1741676 | 1/2007 |
| WO | 2004079051 | 9/2004 |
| EP | 1754804 | 2/2007 |
| WO | 2004106242 | 12/2004 |
| EP | 1903128 | 3/2008 |
| WO | 2004108607 | 12/2004 |
| EP | 1932809 | 6/2008 |
| WO | 2005012186 | 2/2005 |
| EP | 1941912 | 7/2008 |
| WO | 2005014058 | 2/2005 |
| EP | 1978142 | 10/2008 |
| WO | 2005020780 | 3/2005 |
| EP | 2050378 | 4/2009 |
| WO | 2005079468 | 9/2005 |
| EP | 2078700 | 7/2009 |
| WO | 2005084786 | 9/2005 |
| EP | 2078701 | 7/2009 |
| WO | 2005093129 | 10/2005 |
| EP | 2100623 | 9/2009 |
| WO | 2005094904 | 10/2005 |
| EP | 2103244 | 9/2009 |
| WO | 2005097350 | 10/2005 |
| EP | 2168604 | 3/2010 |
| WO | WO 2006098041 A1 * | 9/2006 |
| FR | 2381835 | 9/1978 |
| WO | 2006124805 | 11/2006 |
| FR | 2909370 | 6/2008 |
| WO | 2007031779 | 3/2007 |
| GB | 611819 | 11/1948 |
| WO | 2007057146 | 5/2007 |
| GB | 2149423 | 11/1983 |
| WO | 2007092597 | 8/2007 |
| GB | 2141738 | 1/1985 |
| WO | 2007093395 | 8/2007 |
| GB | 2298858 | 9/1996 |
| WO | 2007095072 | 8/2007 |
| GB | 2381187 | 4/2003 |
| WO | 2007095074 | 8/2007 |
| GB | 2393737 | 4/2004 |
| WO | 2007138363 | 12/2007 |
| JP | 1111483 | 4/1989 |
| WO | 2007142693 | 12/2007 |
| JP | 03157188 | 7/1991 |
| WO | 2007145058 | 12/2007 |
| JP | 04058931 | 2/1992 |
| WO | 2007145385 | 12/2007 |
| JP | 07233493 | 9/1995 |
| WO | 2008032544 | 3/2008 |
| JP | 07263391 | 10/1995 |
| WO | 2008061546 | 5/2008 |
| JP | 07263398 | 10/1995 |
| WO | 2008131389 | 10/2008 |
| JP | 08112574 | 5/1996 |
| WO | 2009011841 | 1/2009 |
| JP | 09075427 | 3/1997 |
| WO | 2009039674 | 4/2009 |
| JP | 1997-174054 | 7/1997 |
| WO | 2009040407 | 4/2009 |
| JP | 11090442 | 9/1997 |
| WO | 2009046563 | 4/2009 |
| JP | 10057282 | 3/1998 |
| WO | 2009067838 | 6/2009 |
| JP | 11010159 | 1/1999 |
| WO | 2009155546 | 12/2009 |
| JP | 11057715 | 3/1999 | | | |

| | | |
|---|---|---|
| WO | 2010028031 | 3/2010 |
| WO | 2010055108 | 5/2010 |
| WO | 2010077968 | 7/2010 |

OTHER PUBLICATIONS

Written Opinion of the International Searching Authority of corresponding International Application No. PCTUS2008/078719, filed Mar. 10, 2008.
"Conductive Polymers: Evaluation of Industrial Applications" Synthetic Metals, 55-57 (1993) 3623-3631 S. Roth et al.
"Fast-Foam Scrubbing Technology, The Safe Scrubbing Alternative,T5-Parts Manual," Tennant Company,www.tennantco.com, 2006.
"Fast-Foam Scrubbing Technology, The Safe Scrubbing Alternative, T5-Scrubber-Dryer Operator Manual," Tennant Company, www.tennantco.com, 2006.
"ECO Smarte-The Best Multiple Mineral Technology for Problem Well Water; The Best Chemical Reduction System for City Water Complete Bacteria and Scale Control," ECOsmarte® Planet Friendly, Inc., http://www.ecosmarte.com/sciencesummary.html, 1994, pp. 1-13.
"KREBS Engineers® Products," 2006 Krebs Engineers,http//www.krebs.com/about.php/ and http://www.krebs.com/products/php/product/20/CycloClean%AE+Modules, 2006, pp. 1-3.
"The Oxygenator Livelier Bait-Healthier fish," Aqua Innovations, Inc., aquainnovationsinc.com, published prior toJan. 19, 2007, pp. 1-2.
"JP102 Water Cell," Emco Tech Co., Ltd. of Goyang-City Kyungki-Do, South Korea, Oct. 18, 2006, pp. 1.
Mary Jones, "Richfield-Based EcoSmarte has Perfected a Natural- and Profitable-Approach to Water Purification,"Minnesota Technology, Inside Technology and Manufacturing Business, Fall 2005, pp. 1-3.
Office Action from the United States Patent and Trademark Office for U.S. Appl. No. 11/655,390, dated Jan. 19, 2007.
Office Action from the United States Patent and Trademark Office for U.S. Appl. No. 11/655,359, dated Mar. 19, 2009.
Restriction Requirement from the United States Patent and Trademark Office for U.S. Appl. No. 11/655,390, dated Apr. 10, 2009.
Office Action from the United States Patent and Trademark Office for U.S. Appl. No. 11/655,390, dated Jul. 16, 2009.
Office Action from the United Stated Patent and Trademark Office for U.S. Appl. No. 11/655,359, dated Nov. 13, 2009.
Aoki et al., "Wafer Treatment Using Electrolysis-Ionized Water", 1994, Jpn. J. Appl. Phys. vol. 33, pp. 5686-5689.
Bluhm, Hans J. et al., "Disruption and Destruction of Biological Cells Using Strong Pulsed Electric Fields" Nachrichten, Karlsruhe, DE, vol. 3, Jan. 1, 2005, pp. 105-110.
3M/DYNEON. "Conductive Polymers" Jul. 30, 2010 Capture of http://solutions.3m.com/wps/porta1/3M/em_US/dyneon_fluoropolymers/Home/Custon_Compounds/Custom_Thermoplastic_Compounds/Conductive_Polymers/ using Wayback Machine Internet Archive http://web.archive.org.
Derrick, Julyne, "How to Remove your Makeup" Jan. 2, 2008. http://beauty.about.com/od/makeuptrickstips/qt/removemakeup.html.
Restriction Requirement from the United States Patent and Trademark Office for U.S. Appl. No. 11/655,385, dated Dec. 9, 2009.
Final Office Action from the United States Patent and Trademark Office for U.S. Appl. No. 11/655,390, dated Jan. 11, 2010.
Office Action from the United States Patent and Trademark Office for U.S. Appl. No. 11/655,378, dated Jan. 14, 2010.
Office Action from the United States Patent and Trademark Office for U.S. Appl. No. 11/655,385, dated Jan. 29, 2010.
Final Office Action from the United States Patent and Trademark Office for U.S. Appl. No. 11/655,378, dated Jul. 2, 2010.
Notice of Allowance from the United States Patent and Trademark Office for U.S. Appl. No. 11/655,385, dated Jul. 14, 2010.
Office Action from the United States Patent and Trademark Office for U.S. Appl. No. 11/655,390, dated Jul. 19, 2010.
Restriction/Election Requirement from the United States Patent and Trademark Office for U.S. Appl. No. 11/655,365, dated Aug. 17, 2010.

Office Action from the United States Patent and Trademark Office for U.S. Appl. No. 11/655,359, dated Aug. 18, 2010.
Office Action from the United States Patent and Trademark Office for U.S. Appl. No. 11/655,378, dated Sep. 9, 2010.
Office Action from the United States Patent and Trademark Office for U.S. Appl. No. 11/655,415, dated Sep. 29, 2010.
Office Action from the United States Patent and Trademark Office for U.S. Appl. No. 11/655,360, dated Sep. 30, 2010.
Office Action from the United States Patent and Trademark Office for U.S. Appl. No. 12/122,350, dated Sep. 30, 2010.
Office Action from the United States Patent and Trademark Office for U.S. Appl. No. 11/655,310, dated Oct. 1, 2010.
Office Action from the United States Patent and Trademark Office for U.S. Appl. No. 11/655,389, dated Oct. 1, 2010.
Office Action from the United States Patent and Trademark Office for U.S. Appl. No. 11/655,365, dated Dec. 3, 2010.
Notice of Allowance from the United States Patent and Trademark Office for U.S. Appl. No. 11/655,390, dated Jan. 6, 2011.
Final Office Action from the United States Patent and Trademark Office for U.S. Appl. No. 11/655,378, dated Jan. 25, 2011.
Office Action from the United States Patent and Trademark Office for U.S. Appl. No. 11/655,359, dated Feb. 3, 2011.
Notice of Allowance from the United States Patent and Trademark Office for U.S. Appl. No. 12/122,350, dated Mar. 16, 2011.
Notice of Allowance from the United States Patent and Trademark Office for U.S. Appl. No. 11/655,389, dated Mar. 17, 2011.
Notice of Allowance from the United States Patent and Trademark Office for U.S. Appl. No. 11/655,360, dated Mar. 18, 2011.
Notice of Allowance from the United States Patent and Trademark Office for U.S. Appl. No. 11/655,415, dated Mar. 23, 2011.
Notice of Allowance from the United States Patent and Trademark Office for U.S. Appl. No. 11/655,310, dated Mar. 23, 2011.
Notice of Allowability from the United States Patent and Trademark Office for U.S. Appl. No. 11/655,378, dated Apr. 28, 2011.
Notice of Allowance from the United States Patent and Trademark Office for U.S. Appl. No. 11/655,378, dated May 10, 2011.
Notice of Allowance from the United States Patent and Trademark Office for U.S. Appl. No. 11/655,359, dated Aug. 11, 2011.
Restriction Requirement from the United Stated Patent and Trademark Office For U.S. Appl. No. 12/481,115, date Oct. 11, 2011.
Office Action from the United States Patent and Trademark Office for U.S. Appl. No. 11/655,365, dated Oct. 12, 2011.
Restriction Requirement from the United States Patent and Trademark Office for U.S. Appl. No. 12/552,508, dated Nov. 8, 2011.
Restriction Requirement from the United States Patent and Trademark Office for U.S. Appl. No. 12/481,115, dated Dec. 6, 2011.
Office Action from the United States Patent and Trademark Office for U.S. Appl. No. 12/481,098, dated Dec. 29, 2011.
Office Action from the United States Patent and Trademark Office for U.S. Appl. No. 12/552,508, dated Jan. 20, 2012.
Notice of Allowance from the United States Patent and Trademark Office for U.S. Appl. No. 11/655,365, dated Jan. 24, 2012.
Office Action from the United States Patent and Trademark Office for U.S. Appl. No. 12/481,115, dated Jan. 31, 2012.
Office Action from the United States Patent and Trademark Office for U.S. Appl. No. 12/488,368, dated Feb. 27, 2012.
Office Action from the United States Patent and Trademark Office for U.S. Appl. No. 12/488,301, dated Mar. 13, 2012.
Restriction Requirement from the United States Patent and Trademark Office for U.S. Appl. No. 12/693,114, dated Mar. 13, 2012.
Restriction Requirement from the United States Patent and Trademark Office for U.S. Appl. No. 12/835,441, dated Mar. 14, 2012.
Office Action from the United States Patent and Trademark Office for U.S. Appl. No. 12/835,441, dated Mar. 27, 2012.
Notice of Allowance from the United States Patent and Trademark Office for U.S. Appl. No. 12/488,360, dated Mar. 29, 2012.
Office Action from the United States Patent and Trademark Office for U.S. Appl. No. 12/488,316, dated Apr. 9, 2012.
Final Office Action from the United States Patent and Trademark Office for U.S. Appl. No. 12/481,098, dated Apr. 17, 2012.
Office Action from the United States Patent and Trademark Office for U.S. Appl. No. 12/693,114, dated Apr. 19, 2012.

Office Action from the United States Patent and Trademark Office for U.S. Appl. No. 12/488,349, dated Apr. 24, 2012.
Final Office Action from the United States Patent and Trademark Office for U.S. Appl. No. 12/481,115, dated May 23, 2012.
Restriction Requirement from the United States Patent and Trademark Office for U.S. Appl. No. 12/872,157, dated May 24, 2012.
Restriction Requirement from the United States Patent and Trademark Office for U.S. Appl. No. 12/835,441, dated Jul. 3, 2012.
Restriction Requirement from the United States Patent and Trademark Office for U.S. Appl. No. 12/639,622, dated Jul. 16, 2012.
Restriction Requirement from the United States Patent and Trademark Office for U.S. Appl. No. 13/017,706, dated Jul. 17, 2012.
Notice of Allowance from the United States Patent and Trademark Office for U.S. Appl. No. 12/488,368, dated Jul. 27, 2012.
Restriction Requirement from the United States Patent and Trademark Office for U.S. Appl. No. 12/639,628, dated Aug. 1, 2012.
Notice of Allowance from the United States Patent and Trademark Office for U.S. Appl. No. 12/693,114, dated Aug. 6, 2012.
Office Action from the United States Patent and Trademark Office for U.S. Appl. No. 12/639,622, dated Aug. 10, 2012.
Office Action from the United States Patent and Trademark Office for U.S. Appl. No. 12/835,441, dated Aug. 29, 2012.

* cited by examiner

METHOD AND APPARATUS FOR NEUTRALIZING ELECTROCHEMICALLY ACTIVATED LIQUIDS

CROSS-REFERENCE TO RELATED APPLICATIONS

The present application is based on and claims the benefit of U.S. provisional patent application Ser. No. 60/977,506, filed Oct. 4, 2007, the content of which is hereby incorporated by reference in its entirety.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to electrochemically activated (EA) liquids, such as acidic EA liquids and alkaline EA liquids. More particularly, the present disclosure relates to methods and apparatus for neutralizing EA liquids prior to disposal into a facility's waste system, for example.

BACKGROUND OF THE DISCLOSURE

Electrolyzed Oxidizing (EO) water and other electrochemically activated liquids are produced by a somewhat simple process of electrolysis. Michael Faraday discovered electrolysis in 1859. Common electrolysis applications include electroplating metals onto other surfaces and the manufacture of household bleach. Today, electrolysis is at the forefront of our energy program. Electrolysis is used to split water molecules to produce hydrogen fuel for fuel cells. EO water generators using the same principals split common salt (sodium chloride as an example) into two special solutions, acidic and alkaline.

A typical electrolysis cell has at least one positive electrode (anode) and at least one negative electrode (cathode), which are separated by an ion-selective membrane to create an anode chamber and a cathode chamber. As the liquid is passed through the chambers, an electric field applied across the electrodes electrochemically activates the liquid by collecting positive ions (e.g., cations, $H^+$) on one side of the membrane and collecting negative ions (e.g., anions, $OH^-$) on the opposing side. The liquid in the chamber having the cations is thereby rendered acidic (i.e., a catholyte EA liquid) and the liquid in the chamber having the anions is correspondingly rendered alkaline (i.e., an anolyte EA liquid).

Electrolysis of water typically requires no chemicals, with essentially nothing added to the water. Electrolyzed alkaline and acidic waters are non-toxic cleaning and sanitizing solutions that can replace chemical detergents and biocides. The advantages of these solutions are lower costs than chemical products, non-toxic to humans, non-drying to skin when used for disinfections, leaves no residues, and microorganisms cannot develop an immunity to the electrical characteristics of the water.

Specific properties of acidic EA water include an extremely high ORP (oxidation-reduction potential), with a small concentration of hypochlorous acid and a low pH. The high ORP value can be above +1200 millivolts, but more typically around +800 millivolts. A millivolt is commonly defined as a measure of the potential energy of a unit charge at a given point in a circuit relative to a reference point (ground). The high ORP value means the solution will take electrons from other molecules, thereby providing improved sanitizing properties. Acidic EA water has a pH value of less than 7.0. The lower pH on the acid side means the higher concentration of hydrogen ions.

Alkaline EA water can replace general purpose cleaners and detergents. One of the specific properties of alkaline EA water is an extremely low ORP. Alkaline EA water has a negative ORP (oxidation reduction potential) in the range of −400 millivolts to −1000 millivolts, for example. The negative ORP means an absence of oxygen. This water is also called "reduced water". Another property of alkaline EA water is a high pH value. Solutions with pH values greater than 7.0 are alkaline.

Commonly, when alkaline water is used for cleaning the acid water with the low pH and high OPR is disposed of into the sewer system of the building. When acidic water is used for sanitizing purposes, the alkaline water with high pH and low ORP is disposed of into the sewer system.

With that said, rules for sewer disposal restrictions and standards vary from city to city, state to state and country to country. The present disclosure pertains to methods and apparatus for neutralizing the alkaline or acidic waste stream before entering the city sewer system, for example. It also pertains to waste water when used in a cleaning situation such as that of a mop and bucket, an automated scrubber/dryer or soft floor maintenance/cleaning.

Various methods of neutralizing alkaline and acidic streams have primarily involved recombining the unused waste stream with the used stream in some fashion. A practical example would be using the alkaline EA water as the primary solution for a purpose such as hard or soft floor surface cleaning. After use, the used alkaline stream in combination with waste products could be blended with the unused acid stream for recombination before disposal. The recombination results in a near instant neutralization of both the alkaline and acidic solutions.

Tennant Company has created a device and process that recombines acidic and alkaline solutions prior to applying the working water to a surface to be cleaned and/or sanitized. For example, modified pH 3 acidic water and pH 11 alkaline water are recombined into a single output stream. The recombined waters are held separated by nanobubbles to obtain a cleaning solution working life of up to 45 seconds, for example. The newly created solution briefly retains the known benefits of acidic and alkaline solutions for the working life and then self-neutralizes.

Another common method of neutralizing electrolyzed wastewater is to let the alkaline and/or acid solutions to sit in open containers to neutralize over time. This method typically requires 24 hours before the liquids reach a safe neutral pH before disposal into sewer system. This method can be inconvenient.

Yet another method of neutralizing electrolyzed wastewater involves organic loading of the alkaline or acid solution. Typically, the alkaline or acid solution will tolerate a 5% organic load before reaching a neutral state over time.

Yet another method includes chemical inducement to neutralizing the streams. However, the added chemicals can increase the cost of the neutralization process.

SUMMARY

An aspect of the present disclosure relates to a method of reducing an oxidation-reduction potential of an acidic liquid or an alkaline liquid having a charge. The method includes injecting the liquid with a charge emitted from an electrode having an opposite charge polarity.

Another aspect of the present disclosure relates to a method, which includes: emitting ions into a liquid having an oxidation reduction potential (ORP), wherein the ions have a charge polarity that is opposite to the ORP of the liquid, whereby the magnitude of the ORP is reduced.

In one aspect, the liquid comprises at least one of an electrochemically activated acidic liquid or electrochemically activated alkaline liquid.

In another aspect, the step of emitting ions comprises: applying a voltage to an electrode; and emitting the ions into the liquid from the electrode.

In another aspect, the method further comprises physically contacting the electrode with the liquid during the steps of applying a voltage and emitting the ions.

In another aspect, the electrode extends through a wall of a container containing the liquid.

In another aspect, the method includes:
producing an acidic liquid and an alkaline liquid with an electrolysis cell;
delivering the acidic liquid and the alkaline liquid to respective first and second outlets of a platform supporting the electrolysis cell; and
performing the step of emitting ions to at least one of the acidic liquid or the alkaline liquid on the platform, between the electrolysis cell and the respective first or second outlet.

In yet another aspect, the platform is selected from the group comprising a mobile surface cleaner, a wall-mount platform, a floor-mount platform, a table-top platform and a hand-held platform.

In another aspect, the method includes:
placing the liquid in a tank carried by a mobile surface cleaner;
dispensing the liquid to a surface and recovering a portion of the liquid from the surface by a recovery device carried by the cleaner;
placing the recovered portion of the liquid in a recovery tank carried by the cleaner; and
performing the step of emitting ions to the recovered liquid on the cleaner.

In another aspect, the method includes: producing an acidic liquid and an alkaline liquid with an electrolysis cell; using one of the acidic liquid or the alkaline liquid as a working liquid in a process; and performing the step of emitting ions to the other of the acidic liquid or the alkaline liquid prior to disposing the liquid to a waste system.

In a further aspect, the method includes: producing the liquid with an electrolysis cell; using the liquid as a working liquid in a process; recovering a portion of the liquid from the process; performing the step of emitting ions to the recovered portion of the liquid prior to disposing the recovered portion to a waste system.

Another aspect of the present disclosure relates to an apparatus, which includes a liquid container, which is adapted to receive a liquid comprising at least one of an acidic or an alkaline having an electrical charge. An ion generator comprising an electrode is positioned to emit ions into the liquid within the container when the electrode is energized by the ion generator. The ions have an opposite charge polarity than the charge of the liquid.

In one particular aspect, the apparatus further includes an electrolysis cell having first and second liquid outputs, wherein the electrode is coupled in a flow path from one of the first and second outputs.

In another aspect, the electrode is positioned to physically contact the liquid in the container.

In another aspect, the electrode extends through a wall of the container.

In another aspect, the container is selected from the group comprising a tank and a tube.

In another aspect, the apparatus further includes
a platform having a liquid source and first and second outlets; and
an electrolysis cell carried by the platform and having an acid output flow path coupled to the first platform outlet and an alkaline output flow path coupled to the second platform outlet,
wherein the container and the ion generator are carried by the platform and the ion generator emits ions into at least one of the acid output flow path or the alkaline output flow path, between the electrolysis cell and the first or second platform outlets.

In yet another aspect of the apparatus, the platform is selected from the group comprising a mobile surface cleaner, a wall-mount platform, a floor-mount platform, a table-top platform and a hand-held platform.

In a further aspect, the disclosure relates to a mobile surface cleaner. The cleaner includes:
a tank for containing the liquid and carried by the cleaner;
a dispenser, which dispenses the liquid in the tank from the cleaner to a surface;
a recovery device, carried by the cleaner and which recovers a portion of the liquid from the surface;
a recovery tank for containing the portion of the liquid recovered from the surface; and
liquid flow paths from the recovery device to the recovery tank and from the recovery tank to an outlet of the cleaner, wherein the ion generator is located to emit the ions into the recovered portion of the liquid onboard the cleaner.

In a particular aspect, the ion generator is located to emit the ions into the recovered portion along at least one of the flow paths or within the tank.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

1. Introduction

Figure 1:
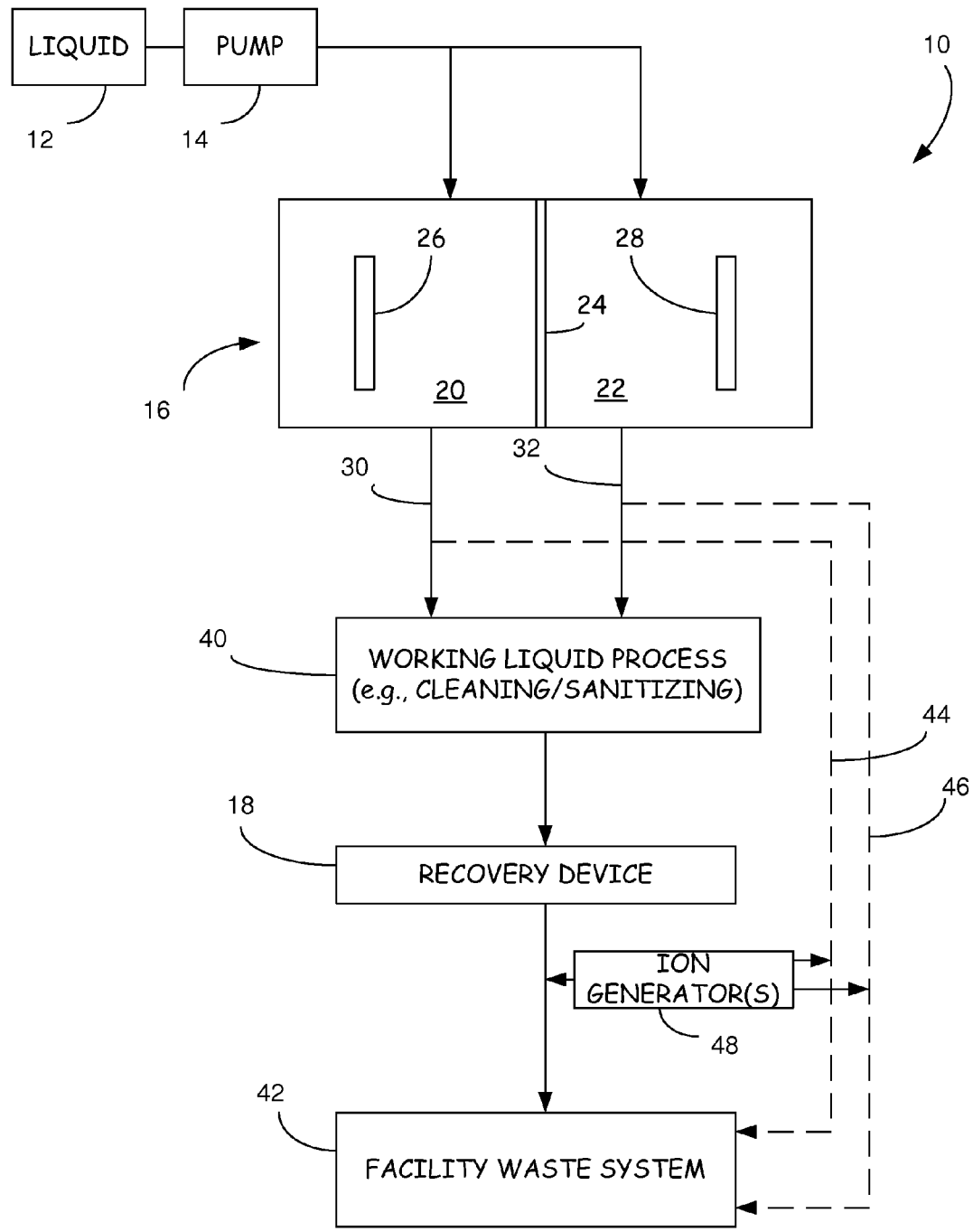
FIG. 1 is a schematic diagram of a system in which one or more ion generators are used to reduce the ORP of an electrochemically activated liquid in accordance with an exemplary aspect of the present disclosure.

One aspect of the present disclosure relates a method and apparatus for neutralizing an alkaline and/or acidic liquid to near zero ORP (or otherwise reducing the ORP magnitude) prior to disposing the liquid into a facility's waste system. The alkaline and/or acid liquid is neutralized by contacting the liquid with ions that are generated by an ion generator and have an electrical polarity that is the opposite to the polarity of the liquid's ORP.

The liquid to be neutralized can be generated by an electrolysis cell, for example, which can be utilized in, for example, a wall-mount unit, a floor-mount unit, a table-top unit, a hand-held device or any of a number of different mobile devices that are capable of creating an acid and/or an alkaline stream. Most electrolysis cells generate both an alkaline stream and an acid stream. Often, only one stream is used as a working liquid, while the other stream is disposed of.

Such a neutralization method can be used to quickly neutralize the unused liquid prior to disposal. For example, the ion generator can be located downstream of the electrolysis cell, along a waste stream path that is connected to the facility's waste system. The method can also be used to neutralize the working liquid after use and prior to disposal.

An ion is an atom or group of atoms that possess an electric charge. An ion gets its electrical charge by losing or gaining electrons. If it gains an extra electron then it is a negative ion, also called an anion. If it loses an electron it is a positive ion or a cation. It has been discovered that, if disposing a negatively charged alkaline solution with a charge potential of −400 millivolts to −1000 millivolts, for example, the charge can be instantly neutralized (or otherwise reduced) before it is disposed of by interjecting a positive ion charge of equal, greater, or less intensity to the alkaline solution created by simple plates and using a positive ion generator to create the neutralizing charge.

Similarly, if disposing an acid solution with a charge potential of +800 millivolts to +1200 millivolts the charge can be instantly neutralized (or reduced) before it is disposed of by interjecting a negative ion charge of equal, greater, or less intensity to the alkaline solution by simple plates and using a negative ion generator to create the said charge.

A typical negative or positive ion generator emits a stream of negative ions or positive ions into the air. In an aspect of the present disclosure, this stream is emitted into a liquid having a charge with an opposite polarity in order to reduce its ORP. The principle of ion generation is simple. The electrical charge on an object is greatest at the sharpest point, so if a high negative or positive voltage is applied to an electrode tip, such as a sharp needle, then the charge at the tip can become so high that ions are literally thrown off and then repelled by the charge on the tip, into the liquid.

An ion generator creates charged particles, such as a focused beam or non-focussed emission. The ion generator can be used to interject the charged particles into a solution. This process is easily adaptable to any non-ferrous container, such as a tube or other container, for example, containing a flowing or non-flowing solution. In one embodiment, the device that generates the charged particles does not contact the liquid being neutralized. In another embodiment, the ion generator has an electrode that physically contacts the liquid.

For example, the charged particles can be interjected into a stream of solution, either alkaline or acidic, that flows through a small tube. The ion transfer components can be attached to or arranged relative to a non-conductive tube so as to interject the charged particles through the walls of the tube, for example. For example, the ion generator can have one or more electrode tips that extend through the tube walls so as to contact liquid flowing through the tube. The ion transfer components can be connected to a voltage source, such as a voltage multiplication circuit. The multiplication circuit can be configured to generate a suitable positive and/or negative voltage to inject either positive or negative ions through the tube, whereby the acid or alkaline solution to be neutralized is flowing through to a drain, sewer system or holding tank as examples.

An effect of contacting and/or non-contacting ion transfer is to instantly null the opposite charge of an alkaline or acidic stream that was created by an electrolysis cell, for example.

2. Example Diagram

FIG. 1 is a schematic diagram of a system 10 in which one or more ion generators are used to reduce the ORP of a liquid in accordance with an exemplary aspect of the present disclosure.

In this example, system 10 includes a liquid source 12, a pump 14, and electrolysis cell 16, and a recovery device 18. Electrolysis cell 16 receives liquid to be treated from liquid source 12, wherein the flow of liquid can be driven by pump 14 or by any other device or method such as by gravity. Liquid source 12 can include a tank or other solution reservoir or can include a fitting or other inlet for receiving a liquid from an external source, for example.

Electrolysis cell 16 can represent any fluid treatment cell that is adapted to apply an electric field across the liquid between at least one anode electrode and at least one cathode electrode. An electrolysis cell can have any suitable number of electrodes, any suitable number of chambers for containing the liquid, and any suitable number of fluid inputs and fluid outputs. The cell can be adapted to treat any fluid (such as a liquid or gas-liquid combination). The cell may include one or more ion-selective membranes between the anode and cathode or can be configured without any ion selective membranes. An electrolysis cell having an ion-selective membrane is referred to herein as a "functional generator".

Wall-mount, floor-mount and countertop electrolyzed generators include units that produce a continuous flow of separated alkaline and acidic streams of solution over a period of time, for example. An example of a large capacity wall-mount unit is available from the company Amano of Japan.

Electrolysis cells can be used in a variety of different applications and can have a variety of different structures, such as but not limited to the structures disclosed in Field et al. U.S. Patent Publication No. 2007/0186368, published Aug. 16, 2007. Thus, although various elements and processes relating to electrolysis are described herein, these elements and processes can be applied to, and incorporated in, other applications.

In the example shown in FIG. 1, electrolysis cell 16 has one or more anode chambers 20 and one or more cathode chambers 22 (known as reaction chambers), which are separated by an ion exchange membrane 24, such as a cation or anion exchange membrane. One or more anode electrodes 26 and cathode electrodes 28 (one of each electrode shown) are disposed in each anode chamber 20 and each cathode chamber 22, respectively. The anode and cathode electrodes 26 and 28 can be made from any suitable material, such as a conductive polymer, titanium and/or titanium coated with a precious metal, such as platinum, or any other suitable electrode material. The electrodes and respective chambers can have any suitable shape and construction. For example, the electrodes can be flat plates, coaxial plates, rods, or a combination thereof. Each electrode can have, for example, a solid construction or can have one or more apertures. In one example, each electrode is formed as a mesh. In addition, multiple cells 16 can be coupled in series or in parallel with one another, for example.

The electrodes 26, 28 are electrically connected to opposite terminals of a power supply (not shown). Ion exchange membrane 24 is located between electrodes 26 and 28. The power supply can provide a constant DC output voltage, a pulsed or otherwise modulated DC output voltage, and/or a pulsed or otherwise modulated AC output voltage to the anode and cathode electrodes, for example. The power supply can have any suitable output voltage level, current level, duty cycle or waveform.

For example in one embodiment, the power supply applies the voltage supplied to the plates at a relative steady state. The power supply (and/or control electronics) includes a DC/DC converter that uses a pulse-width modulation (PWM) control scheme to control voltage and current output. Other types of power supplies can also be used, which can be pulsed or not pulsed and at other voltage and power ranges. The parameters are application-specific.

During operation, feed water (or other liquid to be treated) is supplied from source 12 to both anode chamber 20 and cathode chamber 22. In the case of a cation exchange membrane, upon application of a DC voltage potential across anode 26 and cathode 28, such as a voltage in a range of about 5 Volts (V) to about 25V, cations originally present in the anode chamber 20 move across the ion-exchange membrane 24 towards cathode 28 while anions in anode chamber 20 move towards anode 26. However, anions present in cathode chamber 22 are not able to pass through the cation-exchange membrane, and therefore remain confined within cathode chamber 22.

As a result, cell 16 electrochemically activates the feed water by at least partially utilizing electrolysis and produces electrochemically-activated water in the form of an acidic anolyte composition 30 and a basic catholyte composition 32.

If desired, the anolyte and catholyte can be generated in different ratios to one another through modifications to the structure of the electrolysis cell, for example. For example, the cell can be configured to produce a greater volume of catholyte than anolyte if the primary function of the EA water is cleaning. Alternatively, for example, the cell can be configured to produce a greater volume of anolyte than catholyte if the primary function of the EA water is sanitizing. Also, the concentrations of reactive species in each can be varied.

For example, the cell can have a 3:2 ratio of cathode plates to anode plates for producing a greater volume of catholyte than anolyte. Each cathode plate is separated from a respective anode plate by a respective ion exchange membrane. Thus, there are three cathode chambers for two anode chambers. This configuration produces roughly 60% catholyte to 40% anolyte. Other ratios can also be used.

As mentioned above, the ion exchange membrane 24 can include a cation exchange membrane (i.e., a proton exchange membrane) or an anion exchange membrane. Suitable cation exchange membranes for membrane 24 include partially and fully fluorinated ionomers, polyaromatic ionomers, and combinations thereof. Examples of suitable commercially available ionomers for membrane 24 include sulfonated tetrafluorethylene copolymers available under the trademark "NAFION" from E.I. du Pont de Nemours and Company, Wilmington, Del.; perfluorinated carboxylic acid ionomers available under the trademark "FLEMION" from Asahi Glass Co., Ltd., Japan; perfluorinated sulfonic acid ionomers available under the trademark "ACIPLEX" Aciplex from Asahi Chemical Industries Co. Ltd., Japan; and combinations thereof. However, any ion exchange membrane can be used in other examples.

The acid and alkaline liquid outputs can be coupled to a dispenser, which can include any type of dispenser or dispensers, such as an outlet, fitting, spigot, spray head, a cleaning/sanitizing tool or head, a tube, etc. For example a typical electrolyzer has a first outlet tube for delivering the acid liquid and a second outlet tube for delivering the alkaline liquid. Arrows 30 and 32 can represent any dispenser or outlet tube, for example.

One or both of the acid and alkaline liquid outputs 30 and 32 are generated for use as a working liquid in some sort of process, represented by box 40 in FIG. 1. For example, the acid liquid 30 can be used in a sanitizing process and/or the alkaline liquid can be used in a cleaning process. The working liquid can be applied directly to the surface being treated or stored in a container for later use. In many applications, only one of the acid and alkaline liquids 30, 32 is needed as a working liquid, while the other, non-used liquid is disposed of, typically through a facility's waste system, represented by box 42 and waste paths 44 and 46. Waste paths 44 and 46 can include any type or types of waste path(s), such as a liquid flow path provided by a tube and/or a drain system, a waste tank that is later emptied into facility waste system 42, etc.

However, it may not be desirable to dispose of an acidic or alkaline liquid directly down the facility's waste system 42. For example, rules for sewer disposal restrictions and standards vary from city to city, state to state and country to country. Accordingly, one or more ion generator(s) 48 are used to generate and emit negative and/or positive ions into the unused acid and/or alkaline streams flowing through waste flow paths 44 and 46. The negative ions can be used to neutralize (or at least reduce) the ORP magnitude of the acid waste stream, while the positive ions can be used to neutralize (or at least reduce) the ORP magnitude of the alkaline waste stream.

Ion generator 48 can be located to treat the waste liquid at any suitable location along waste paths 44 and/or 46. For example, ion generator 48 can treat the liquid within a housing or at the outlet of an electrolyzer system carrying electrolysis cell 16, along a drain system, in a waste tank, along a disposal tube extending from a waste tank, and/or within the facility waste system 42.

In some examples, the working liquid (acid and/or alkaline) is recovered after use with recovery device 18. Recovery device 18 can include elements such as a simple drain system, a mop and bucket, and/or a squeegee and vacuum recovery system carried by a mobile hard and/or soft floor surface cleaner, for example. The recovered liquid can be carried in a recovery tank for later disposal or be carried toward the facility's waste system 42 by a drain system.

In a further example, the recovery device 18 further includes a holding tank in which the recovered liquid can be stored for a definite or indefinite period of time before being released to the facility's waste system 42.

Prior to disposal through system 42, it may be desirable to at least partially neutralize the recovered liquid. Either the same or one or more different ion generator(s) 48 can be used to generate ions of the appropriate polarity to at least partially neutralize the ORP of the recovered liquid. This ion generator can be located to treat the recovered liquid at any suitable location along the recovery and disposal paths. For example, the ion generator can treat the liquid directly on the surface being processed by block 40, along a drain system of recovery device 18, in a recovery tank, along a disposal tube extending from a recovery tank, in a holding tank, along the output of the holding tank, and/or within the facility waste system 42.

3. Ion Generator

Figure 2:
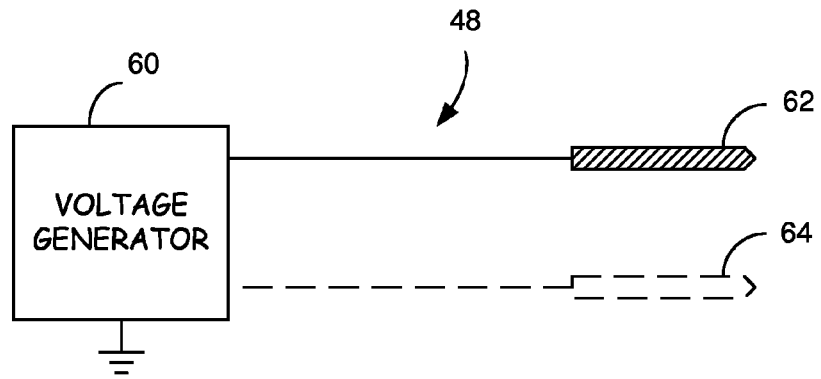
FIG. 2 is a block diagram schematically illustrating an example of ion generator shown in FIG. 1.

FIG. 2 is a block diagram schematically illustrating an example of ion generator 48. Ion generator 48 includes a voltage generator 60 and one or more electrodes 62 for emitting ions of a particular polarity (negative or positive). In some embodiments, ion generator 48 also includes one or more further electrodes 64 emitting ions of the opposite polarity (positive or negative) as electrode(s) 62.

In one example, ion generator 48 is of an electron emission type in which, for negative ion generation, electrons are emitted from electrode 62 by applying a high negative voltage on electrode 62. In another example, ion generator 48 is of a proton emission type in which, for positive ion generation, protons are emitted from electrode 62 by applying a high positive voltage on electrode 62. If both positive and negative ions are desired, then ion generator 48 can be configured to emit different polarity ions from electrodes 62 and 64. In a further example, the voltage applied to electrode 62 is cycled back and forth between a high negative voltage and a high positive voltage, at a suitable frequency and duty cycle, to emit alternately negative and positive ions.

Voltage generator 60 can be configured as desired to apply an appropriate voltage to electrodes 62 and/or 64 with the appropriate potentials and at the appropriate times, by a suitable electronic control system, for example. In one example, voltage generator 60 includes a voltage multiplication circuit. The multiplication circuit can be configured to generate a suitable positive and/or negative voltage to inject either positive or negative ions into the liquid being neutralized.

Electrodes 62 and 64 can have a variety of different shapes and can be made of a variety of different conductive materials. For example, the electrodes can include solid plates, conductive meshes, solid or hollow rods, spikes, pins, wires, etc.

In a further example, ion generator 48 is configured to energize both electrodes 62 and 64 concurrently and/or sequentially, such as by cycling back and forth, and both electrodes 62 and 64 are positioned along the same waste and/or recovery path to provide a generic treatment for both acid and alkaline liquids. In another example, one set of electrode(s) is used, which are driven alternately to negative and positive voltages so as to emit alternately negative and positive ions into the liquid being neutralized.

Figure 3:
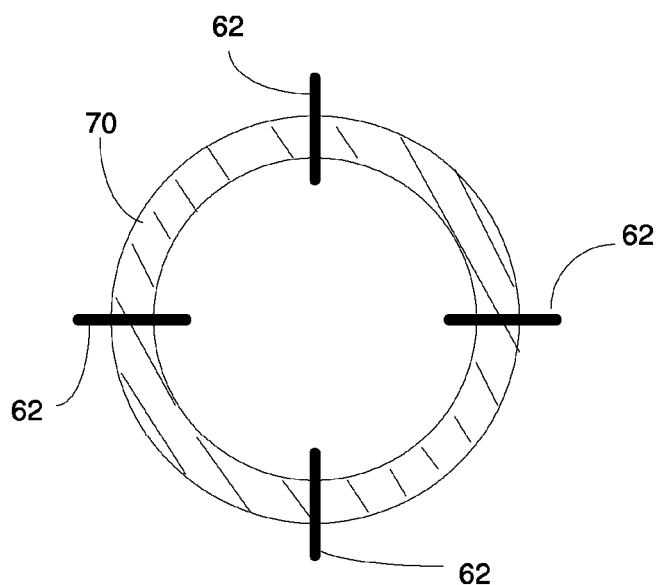
FIG. 3 is a diagram illustrating a cross-section of a tube through which the liquid being neutralized flows and which includes a plurality of ion-emitting electrodes, according to an aspect of the present disclosure.

FIG. 3 illustrates an example in which each electrode 62 (and/or 64) includes a plurality of conductive pins that extend through the sidewalls of a non-conductive tube 70 that contains the liquid being neutralized. In this example, the conductive pins 62 are arranged radially, around the circumference of tube 70. In other examples, pins 62 can be arranged in a line parallel to the central axis of tube 70, along the top and/or bottom of tube 70. Any number of pins or arrangements can be used. In one example, the sidewalls of tube 70 are somewhat compliant and self-seal about pins 62 such that liquid does not escape through the openings created by the pins. Other methods of sealing the tube can also be used.

As the liquid flows through the tube and contacts the electrodes, the energized electrodes emit ions into the liquid having an opposite charge that is equal, greater, or less intensity to the ORP of the liquid, which neutralizes (or at least reduces) the magnitude of the ORP.

In one example, the liquid has an ORP of −400 millivolts to −1000 millivolts, and the ion generator is adapted to reduce the ORP of the treated liquid to a value less than or equal to +/−50 millivolts. In another example, the liquid has a charge potential of +800 millivolts to +1200 millivolts, and the ion generator is adapted to reduce the ORP of the liquid to +/−50 millivolts.

Figure 4:
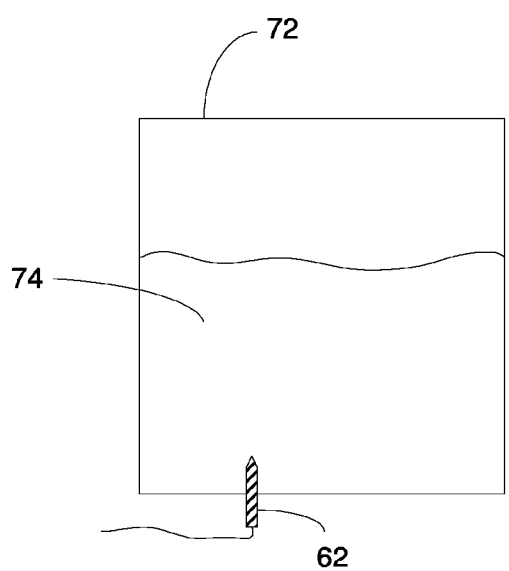
FIG. 4 is a diagram illustrating and example in which an ion-emitting electrode extends into the interior of a waste or recovery tank that contains an acid and/or alkaline liquid to be neutralized.

FIG. 4 is a diagram illustrating and example in which electrode 62 (and/or 64) extends into the interior of a waste or recovery tank 72 that contains an acid and/or alkaline liquid 74 to be neutralized.

In a further example, the electrode 62 (and/or 64) is located inside a container that contains the liquid (such as a tube or tank in which the liquid is flowing or stagnant), rather than extending through a container wall as shown in FIGS. 3 and 4.

In a further example, the electrode 62 (and/or 64) is arranged to contact the liquid as it is dispensed, such as from a tube or tank. For example, the liquid can be poured or sprayed onto the electrode(s).

4. Wall-Mount (or Table-Top) Platform

Figure 5:
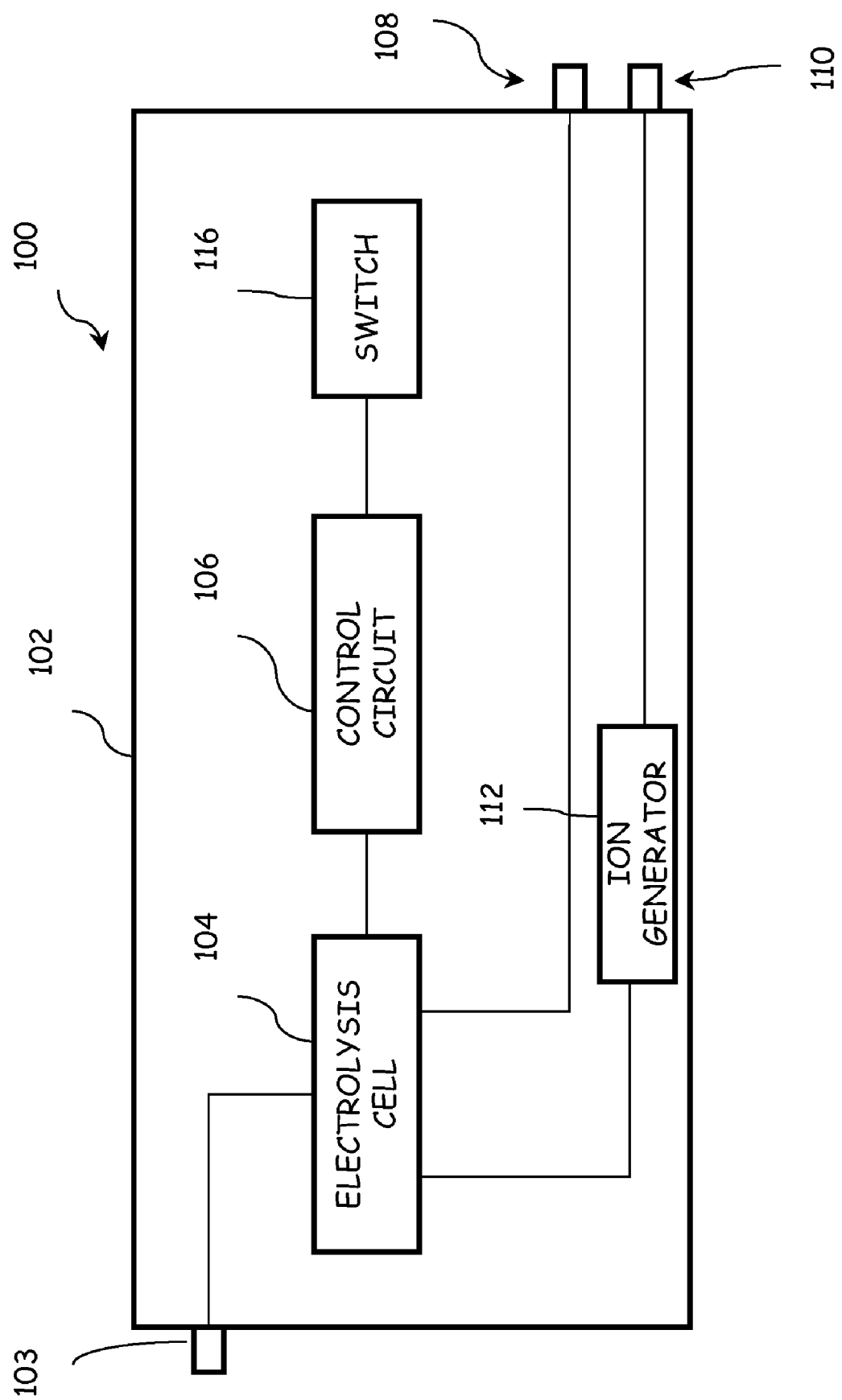
FIG. 5 illustrates a simplified block diagram of a cleaning and/or sanitizing liquid generator that is mounted to a platform according to an exemplary embodiment.

FIG. 5 illustrates a simplified block diagram of a cleaning and/or sanitizing liquid generator 100 that is mounted to a platform 102 according to an exemplary embodiment. Platform 102 can be configured to be mounted or placed in a facility on a floor, a wall, a bench or other surface, held by hand, carried by an operator or vehicle, attached on to another device (such as carried by a cleaning or maintenance trolley or mop bucket), or carried on a person. In one specific embodiment, platform 102 is mounted to the wall of a facility for loading devices, such as mop buckets, mobile cleaning machines, etc., with cleaning and/or sanitizing liquid.

Platform 102 includes an inlet 103 for receiving a liquid, such as tap water, from a source. Alternatively, for example, platform 102 can include a tank for holding a supply of liquid to be treated. Platform 102 further includes one or more electrolysis cells 104 and a control circuit 106. Electrolysis cell(s) 104 can have any of the structures described herein or any other suitable structure. Platform 102 can also include any other devices or components such as but not limited to those disclosed herein.

The flow path or paths from the output of electrolysis cell 104 can be configured to dispense acid EA liquid and alkaline EA liquid separately and/or blended acid and/or alkaline EA liquid through outlet 108. In a particular example, only one of the acid or alkaline liquids is used as a working liquid. The other, unused acid or alkaline liquid can be directed to a waste tank on platform 102 or to a drain outlet 110, for example.

An ion generator 112 is positioned along the waste flow path 114 and/or relative to the a waste tank on platform 102 so as to reduce the ORP of the unused liquid prior to disposal through outlet 110. The ion generator can treat the liquid upstream, downstream and/or within the waste tank and/or anywhere along the flow path 114. In this example, ion generator 114 can be positioned within a housing containing electrolysis cell 104 and control circuit 106. In another example, ion generator 110 is external to such a housing and can be located along a disposal path from outlet 110.

The control circuit 106 energizes the anodes and cathodes of electrolysis cell 104 with a suitable voltage pattern to generate the acid and alkaline liquid outputs and energizes ion generator 106 with a voltage pattern that is suitable to reduce the ORP of an unused stream (acid and/or or alkaline) by a desired magnitude. For example, the control circuit can be configured to operate the electrolysis cell and ion generator "on-demand" under the control of one or more switches or control inputs 116. When an operator activates cleaning/sanitizing liquid generator 100 through switch 116, control circuit 106 energizes electrolysis cell 104 to an acid/alkaline working liquid that is dispensed through outlet 108. Concurrently, for example, control circuit 106 energizes ion generator 112 to reduce the ORP of any unused liquid stream such that it may be disposed of immediately (or at a later time) through outlet 110. Alternatively, for example, control circuit 106 can wait a specified time period for unused liquid to collect in a waste tank and then energize ion generator 112 at suitable times to neutralize the liquid contained in the tank or dispensed form the tank.

5. Mobile Surface Cleaner

The features and methods described herein, such as those of the electrolysis cell and ion generator, can be used onboard (or off-board) a mobile surface cleaner, such as a mobile hard floor surface cleaner, a mobile soft floor surface cleaner, a mobile surface cleaner that is adapted to clean both hard and soft floors or other surfaces, or a mop-and-bucket system, for example.

Field et al. U.S. Publication No. 2007/0186368 A1 discloses various apparatus in which the features and methods described herein can be used, such as a mobile surface cleaner having a mobile body configured to travel over a surface. The mobile body has a tank for containing a cleaning liquid, such as tap water, a liquid dispenser and a flowpath from the tank to the liquid dispenser. An electrolysis cell is coupled in the flowpath. The electrolysis cell has an anode chamber and a cathode chamber separated by an ion exchange membrane and electrochemically activates tap water that has passed through the functional generator.

The electrolysis cell converts the tap water into an anolyte EA liquid and a catholyte EA liquid. The anolyte EA liquid and the catholyte EA liquid can be separately applied to the surface being cleaned and/or sanitized, or can be combined on-board the apparatus to form a combination anolyte and catholyte EA liquid and dispensed together through a cleaning head, for example. In one example, only one liquid stream, such as the catholyte (alkaline) stream is dispensed through the cleaning head. The other stream, such as the anolyte (acid) stream is routed to a waste/recovery tank.

In another example, the mobile surface cleaner does not include an electrolysis cell. Rather, the source tank is filled with an alkaline liquid (or an acid liquid) to be dispensed through the cleaning head, for example.

Figure 6:
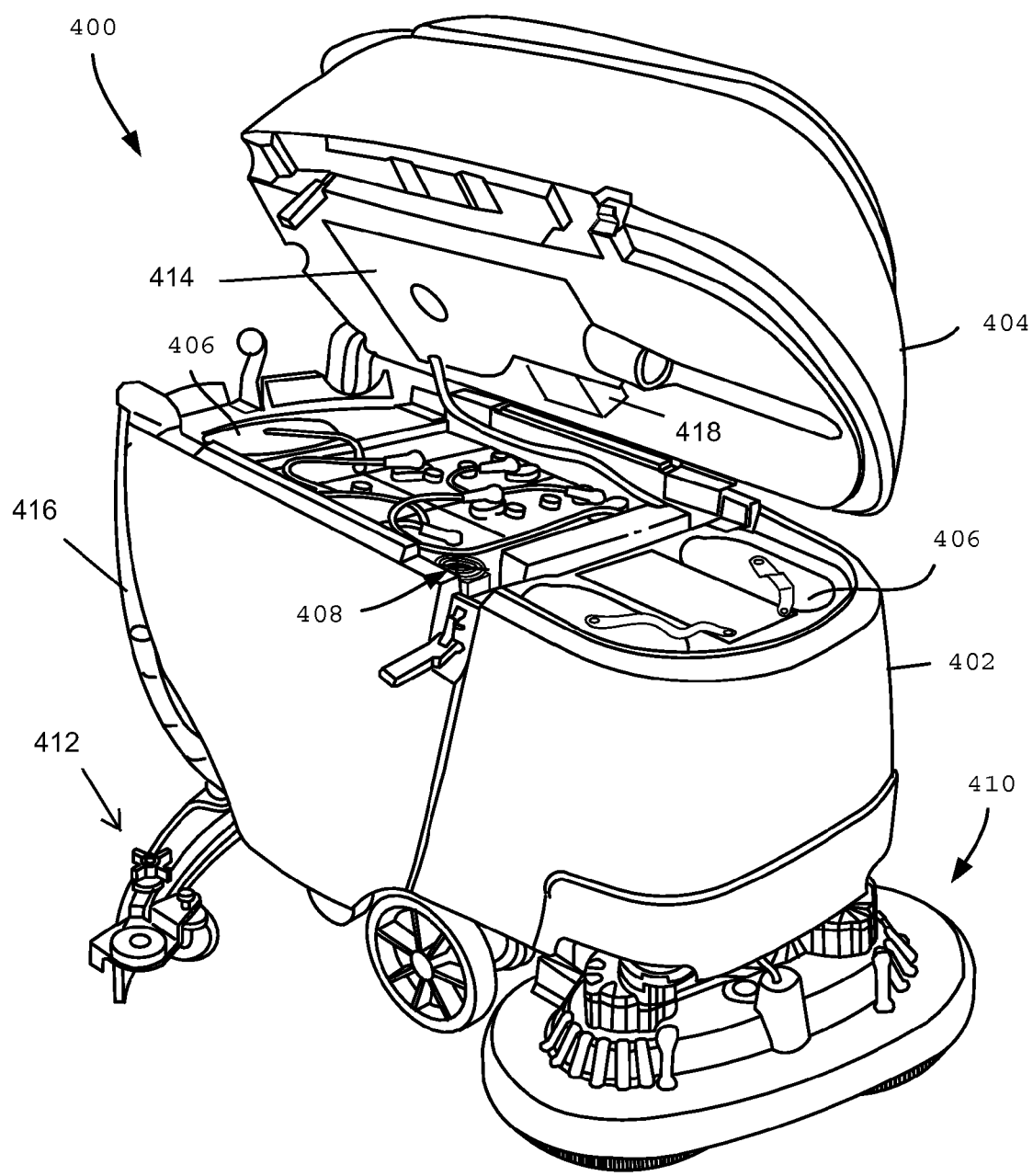
FIG. 6 illustrates an example of a mobile hard and/or soft floor surface cleaner according to an exemplary embodiment.

FIG. 6 illustrates an example of a mobile hard and/or soft floor surface cleaner 400 disclosed in Field et al. U.S. Publication No. 2007/0186368 A1 in which one or more of the above-described features and/or methods can be implemented. FIG. 6 is a perspective view of cleaner 400 having its lid in an open position.

In this example, cleaner 400 is a walk-behind cleaner used to clean hard floor surfaces, such as concrete, tile, vinyl, terrazzo, etc. in other examples, cleaner 400 can be configured as a ride-on, attachable, or towed-behind cleaner for performing a cleaning and/or sanitizing operation as described herein. In a further example, cleaner 400 can be adapted to clean soft floors, such as carpet, or both hard and soft floors in further embodiments. Cleaner 400 may include electrical motors powered through an on-board power source, such as batteries, or through an electrical cord. Alternatively, for example, an internal combustion engine system could be used either alone, or in combination with, the electric motors.

Cleaner 400 generally includes a base 402 and a lid 404, which is attached along one side of the base 402 by hinges (not shown) so that lid 404 can be pivoted up to provide access to the interior of base 402. Base 402 includes a tank 406 for containing a liquid or a primary cleaning and/or sanitizing liquid component (such as regular tap water) to be treated and applied to the floor surface during cleaning/sanitizing operations. Alternatively, for example, the liquid can be treated offboard cleaner 400 prior to containment in tank 406, as mentioned above.

When the liquid is treated onboard, cleaner 400 includes an electrolysis cell 408, which treats the liquid prior to the liquid being applied to the floor being cleaned. The treated liquid can be applied to the floor directly and/or through a cleaning head 410, for example. The treated liquid that is applied to the floor can include an anolyte EA liquid stream, a catholyte EA liquid stream, both and anolyte and catholyte EA liquid streams and/or a combined anolyte and catholyte EA liquid stream. The cell 408 can include an ion selective membrane or be configured without an ion selective membrane.

When the liquid is treated offboard, the source tank 406 is filled with an acid or alkaline liquid, such as acid or alkaline EA water, which is dispensed through cleaning head 410 and/or directly to the floor, for example.

In both examples, as the cleaner 400 advances along the floor being cleaned, a recovery device comprising a vacuum squeegee or other recovery device recovers a portion of the soiled liquid from the floor and places the recovered liquid in a recovery tank 414 carried in lid 404.

Cleaner 400 further includes a waste tube 416, which is coupled to the recovery tank 414. When the operator wishes to empty tank 414, the operator directs a free end of waste tube 416 to the facility's waste system, such as waste system 42 shown in FIG. 1, and empties the tank. Cleaner 400 includes an ion generator 418, which can be coupled at a suitable location along waste liquid flow path. For example, the ion generator can be coupled to reduce the ORP of the recovered liquid at a location between recovery device 412 and recovery tank 414, within recovery tank 414, between recovery tank 414 and waste tube 416, and/or along waste tube 416. In a further example, ion generator can be used external to cleaner 400 as a separate device.

6. Holding Tank

Figure 7:
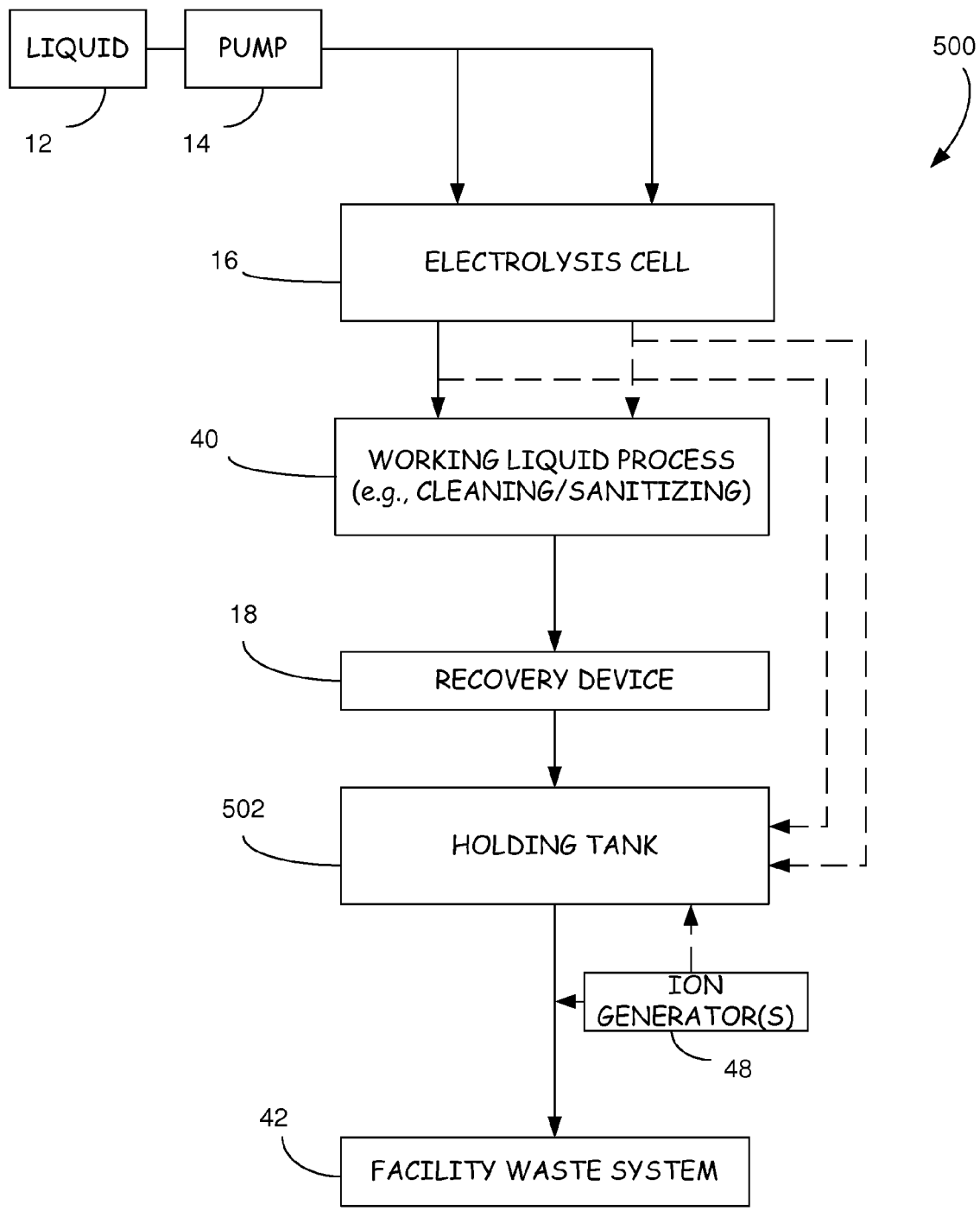
FIG. 7 is a block diagram illustrating a system in which the liquid to be neutralized is contained in a holding tank prior to disposal.

FIG. 7 is a block diagram illustrating a system 500 in which the liquid to be neutralized is contained in a holding tank prior to disposal through a facility's waste system. The same reference numerals are used in FIG. 7 as were used in FIG. 1 for the same or similar elements. FIG. 7 shows an example in which the working liquid, an acid and/or alkaline liquid, is recovered from a process 40 and then placed in a holding tank 502 for a definite or indefinite period of time before being released for disposal through the facility's waste system 42. For example, an electrochemically-activated working liquid can be placed in a mobile cleaning device, such as a hard floor surface cleaner, dispensed to a surface being cleaned and then recovered from the surface by an onboard recovery device 18, for example, and held in a waste tank carried by the cleaning device. The recovered liquid can then be emptied from the waste tank into holding tank 502. Holding tank 502 can include, for example, an immobile or mobile tank that is located within the facility for storing recovered liquid prior to disposal. For example, some facilities include open-air holding tanks for holding acidic and/or alkaline liquids after use to allow the liquids to neutralize substantially before for releasing the liquids down the drain and sewer system of the facility.

Ion generator(s) 48 can be located to treat the liquid held in holding tank 502 and/or along the output of holding tank 502, prior to disposal through waste system 42, for example. Also, ion generator(s) 48 can be located to treat the liquid prior to being placed in holding tank 502.

Although the present disclosure has been described with reference to one or more examples, workers skilled in the art will recognize that changes may be made in form and detail without departing from the scope of the disclosure and/or the appended claims.

The invention claimed is:

1. A method comprising:
providing at least one of an acidic liquid having a positive oxidation reduction potential or an alkaline liquid having a negative oxidation reduction potential;
dispensing at least one of the acidic liquid or the alkaline liquid to a surface as a dispensed liquid;
using the dispensed liquid as a working liquid in at least one of a cleaning or sanitizing operation;
recovering at least a portion of the dispensed liquid from the surface; and
treating the recovered liquid by applying an electric potential to an electrode, wherein the electric potential is negative if the oxidation reduction potential of the recovered liquid being treated is positive and the electric potential is positive if the oxidation reduction potential of the recovered liquid is negative, so as to generate ions in the recovered liquid that reduce the magnitude of the oxidation reduction potential.

2. A method comprising:
providing at least one of an acidic liquid having a positive oxidation reduction potential (ORP) of at least +800 millivolts or an alkaline liquid having a negative ORP of less than −400 millivolts;
dispensing at least one of the acidic liquid or the alkaline liquid to a surface as a dispensed liquid;
using the dispensed liquid as a working liquid in at least one of a cleaning or sanitizing operation;
recovering at least a portion of the dispensed liquid from the surface; and
treating the recovered liquid by applying an electric potential to an electrode, wherein the electric potential is negative if the ORP of the recovered liquid being treated is positive and the electric potential is positive if the ORP of the recovered liquid being treated is negative so as to generate ions in the recovered liquid that neutralize the ORP of the recovered liquid being treated to a range of +50 millivolts to −50 millivolts.

3. The method of claim 2, wherein the step of providing comprises generating the at least one of the acidic liquid or the alkaline liquid with an electrolysis cell.

4. The method of claim 2 and further comprising:
physically contacting the electrode with the recovered liquid during the step of applying an electric potential.

5. The method of claim 4, wherein the electrode extends through a wall of a container containing the recovered liquid.

6. The method of claim 2 and further comprising:
producing the acidic liquid and the alkaline liquid with an electrolysis cell;
delivering the acidic liquid and the alkaline liquid to respective first and second outlets of a platform supporting the electrolysis cell, wherein one of the first or second outlets is a working outlet and the other is a waste outlet;
performing the step of dispensing from the working outlet;
placing the recovered liquid in a recovery tank on the platform, which is coupled to the waste outlet; and
performing the step of applying the electric potential on the platform, the electrode being positioned in a flow path between the electrolysis cell and the waste outlet.

7. The method of claim 3, wherein the step of generating is performed on a platform that is selected from the group consisting of a mobile surface cleaner, a wall-mount platform, a floor-mount platform, a table-top platform and a hand-held platform.

8. The method of claim 2 and further comprising:
dispensing the dispensed liquid from a mobile surface cleaner to a surface and recovering the portion of the dispensed liquid from the surface by a recovery device carried by the cleaner;
placing the recovered portion of the liquid in a recovery tank carried by the cleaner; and
performing the step of applying the electric potential to the electrode to generate ions in the recovered liquid on the cleaner.

9. An apparatus comprising:
a mobile surface cleaner;
a dispenser, which is configured to dispense at least one of an acidic liquid having a positive oxidation reduction potential or an alkaline liquid having a negative oxidation reduction potential from the cleaner to a surface as a dispensed liquid;
a recovery device carried by the cleaner, which recovers a portion of the dispensed liquid from the surface;
a recovery tank for containing the portion of the liquid recovered from the surface;
liquid flow paths from the recovery device to the recovery tank and from the recovery tank to an outlet of the cleaner; and
an ion generator comprising an electrode positioned to generate the ions in the recovered portion of the liquid onboard the cleaner when the electrode is energized by an electric potential applied to the electrode by the ion generator, wherein the electric potential is negative if the oxidation-reduction potential of the recovered liquid is positive or the electric potential is positive if the oxidation-reduction potential of the recovered liquid is negative so that the ions generated in the recovered liquid at least partially neutralize the oxidation reduction potential of the recovered liquid.

10. The apparatus of claim 9 and further comprising:
an electrolysis cell onboard the mobile surface cleaner, which generates the at least one acidic liquid or alkaline liquid and has first and second liquid outputs, wherein the electrode is coupled in a flow path from one of the first and second outputs.

11. The apparatus of claim 9, wherein the electrode is positioned to physically contact the recovered liquid.

12. The apparatus of claim 11, wherein the electrode extends through a wall of the recovery tank.

13. The apparatus of claim 9, wherein the electrode is positioned to generate the ions along at least one of the liquid flow paths.

14. The apparatus of claim 9 and further comprising:
an electrolysis cell carried by the mobile surface cleaner and having an acid output flow path and an alkaline output flow path, wherein one of the acid and alkaline flow paths is coupled to the dispenser.

15. The apparatus of claim 14, wherein the other of the acid and alkaline flow paths is coupled to the recovery tank.

16. The apparatus of claim 9, wherein the ion generator consists of a single electrode.

17. The apparatus of claim 9, wherein the ion generator lacks a further electrode of opposite polarity as the electrode on which the electrical potential is applied.

* * * * *